(12) United States Patent
Wade

(10) Patent No.: US 7,011,107 B2
(45) Date of Patent: Mar. 14, 2006

(54) ADAPTER FOR A FIRST FLUSH WATER DIVERTER

(76) Inventor: Rodney George Wade, 148 Wongawallon Drive, Upper Coomera Queensland (AU) 4210

( * ) Notice: Subject to any disclaimer, the term of this patent is extended or adjusted under 35 U.S.C. 154(b) by 138 days.

(21) Appl. No.: 10/698,518

(22) Filed: Nov. 3, 2003

(65) Prior Publication Data

US 2005/0092381 A1    May 5, 2005

(51) Int. Cl.
*F03B 3/02* (2006.01)
(52) U.S. Cl. .................................................. 137/357
(58) Field of Classification Search ............. 137/356, 137/357
See application file for complete search history.

(56) References Cited

U.S. PATENT DOCUMENTS

| | | | | |
|---|---|---|---|---|
| 264,393 | A | * | 9/1882 | Wilson ...................... 137/122 |
| 5,490,538 | A | * | 2/1996 | Marcel et al. ............. 137/357 |
| 5,533,303 | A | * | 7/1996 | Harvey ........................ 52/16 |
| 6,619,312 | B1 | * | 9/2003 | Doiron ..................... 137/122 |

* cited by examiner

*Primary Examiner*—John Fox
(74) *Attorney, Agent, or Firm*—Nixon & Vanderhye P.C.

(57) ABSTRACT

An adapter for a first flush water diverter is disclosed. The adapter has a collector for receiving water from a containment area. A passage from a lower part of the collector allows water from the lower part to be directed to an attachment portion which in turn is connected to the water diverter. The collector has at least one outlet for directing water to a storage tank.

11 Claims, 2 Drawing Sheets

ADAPTER FOR A FIRST FLUSH WATER DIVERTER

BACKGROUND OF THE INVENTION

This invention relates to an adapter for a first flush water diverter.

First flush water diverters are designed to catch the first flow of water from a catchment area such as a roof of a building when it rains and divert that first flow away from a water storage tank. The first flow of water from a roof normally contains contaminants such as coliforms, bacteria and small unwanted particles such as dust or vegetable matter. After the first flow of water is diverted by the diverter, continued flow of water from the roof is then diverted to the storage tank.

Water diverters are not intended to be rubbish diverters although they do accept a small quantity of debris.

It has been the practice to incorporate filters in water catchment systems. These filters may be present well upstream of the diverter and be incorporated in rain heads for example or downstream of the diverter and be positioned in the storage tank.

Diverters normally include a valve member adapted to engage a valve seat after the first flow of water has been diverted.

With prior first flow diverters there was a danger that debris which was able to enter the diverter would adversely affect the operation of the diverter and more than just the first flow of water was diverted. As a consequence water which should have been directed to the storage tank was lost.

Plumbing requirements vary from country to country and as a consequence water diverters of a suitable diameter for requirements in that country are required. As a consequence water filters of a selection of different sizes were necessary and this added to tooling costs.

OBJECT OF THE INVENTION

It is an object of the invention to provide an adapter for a first flush water diverter which minimises the disadvantage mentioned above.

SUMMARY OF THE INVENTION

According to one aspect of the invention there is provided an adapter for a first flush water diverter, the adapter having a collector for receiving water from a catchment area, a passage from a lower part of the collection through which water may be directed into an attachment portion adapted to couple the adapter to a first flush water diverter and at least one outlet from the collector.

The collector may consist of a housing of any suitable shape. The housing is adapted to receive a filter to allow debris to be collected to prevent the debris from entering the diverter. The housing preferably has an inclined base wall for directing water to the passage. In one embodiment the base wall is inclined and the passage is located adjacent one side of the housing. The housing may have one or more peripheral walls and may be of any desired shape. Preferably, the housing is cylindrical in shape and has an open upper end.

The upper end of the housing may be closed off by a cover. The cover may function to exclude UV radiation from the collector. The cover has at least one inlet to allow water to be directed into the collector. Preferably the cover has two inlets.

The cover may be releasably attached to the adapter. The filter may be located within the housing and preferably rests upon the upper end and is spaced from the base wall.

The or each outlet may be adjacent the passage and be present in a peripheral wall of the housing.

The attachment portion may comprise a cap adapted to fit over an end of a first flush water diverter. Preferably, when the diverter has a circular end, the cap has a circular shape consisting of an upper wall with a downwardly extending circular skirt. The upper wall is preferably downwardly inclined. A passage may extend upwardly from the upper wall of the attachment portion and that portion may be coupled to the passage from the housing. Attachment portions of a desired size may be attached to the housing and a selection of differently sized attachment portions may allow the adapter to be issued with a selection of differently sized first flush diverters.

A support or brace may extend between the attachment portion and the collector housing.

DETAILED DESCRIPTION OF THE PREFERRED EMBODIMENT

Figure 1:
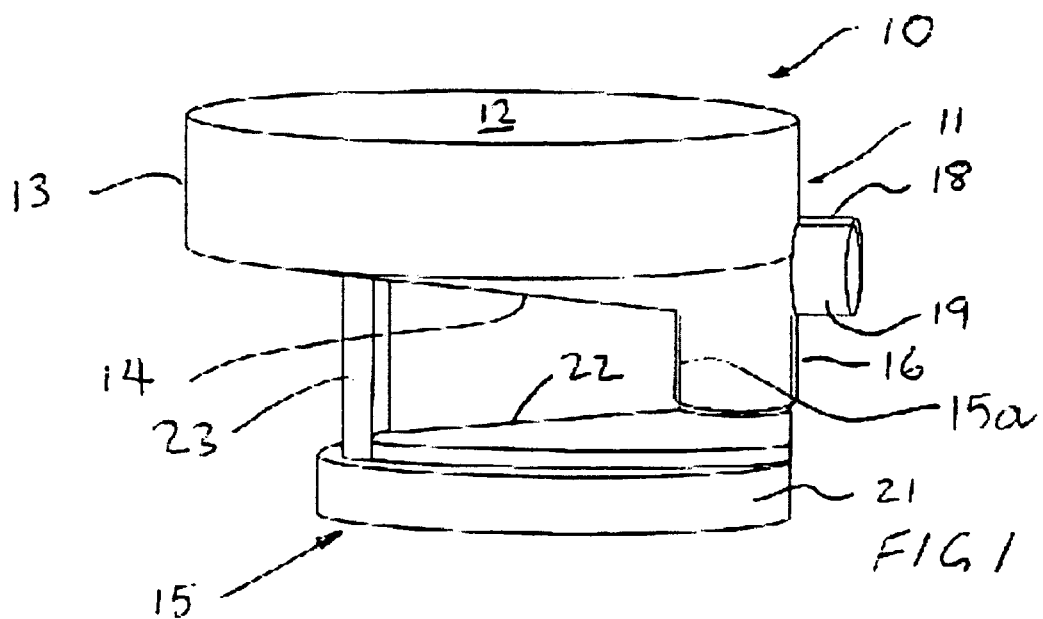
FIG. 1 is a perspective view of an adapter according to an embodiment of the invention.

As shown in FIG. 1, the adapter 10 has a circular collector housing 11. The housing 11 is cylindrical in shape and has an open upper end 12 which may be closed off by a cover 30 (see figures). The housing 11 has a peripheral wall 13 and a sloping base wall 14 which slopes across from one side of the housing 11 to the other side of the housing.

The adapter 10 may be coupled to an attachment portion 15. A passage 16 extends between the housing 11 and an upstanding passage 15a of portion 15 and allows water within the housing 11 to flow therefrom and into a first flush diverter (not shown) coupled to portion 15.

Passage 16 is provided by a downwardly extending spigot whilst passage 15a is provided by an upwardly extending spigot. Outlets 18, 19 extend from the housing 11 at a location adjacent the passage 16.

Attachment portion 15 has an upstanding passage or spigot 15a which is received within passage 16. In this way water within the housing 11 may flow through to the portion 15 and into the flow diverter (not shown) normally attached to portion 15. Portion 15 acts as a cap or cover for the first flush diverter.

The portion 15 has a circular skirt 21 and an inclined upper wall 22. A brace 23 extends between the housing 11 and portion 15 and provides a degree of rigidity to the adapter.

Figure 2:
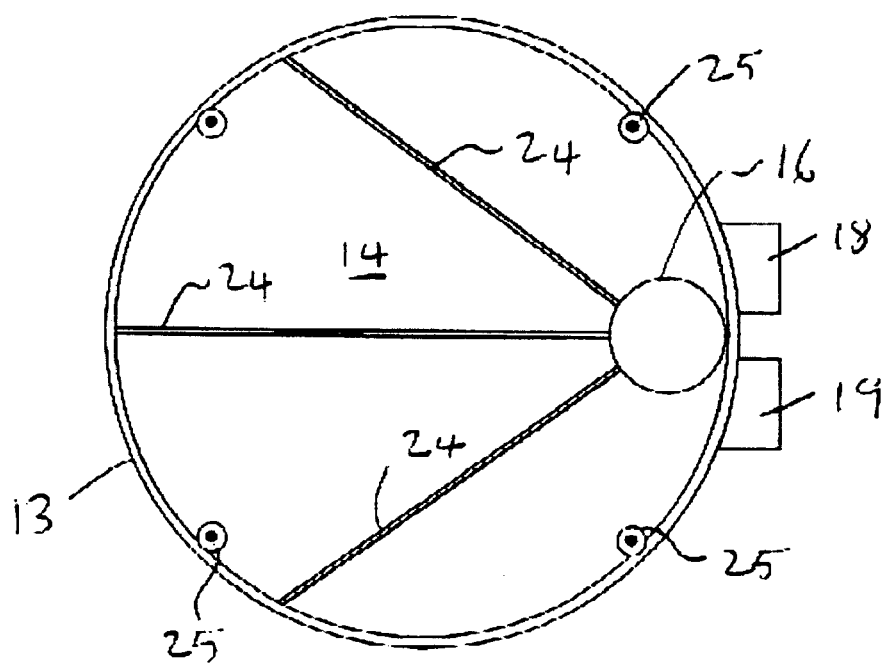
FIG. 2 is a plan view of the adapter of FIG. 1.

As shown in FIG. 2, the inside of the base wall 14 has three strengthening ribs 24 which radiate outwardly from the passage 16 and terminate at the inside of wall 13.

Screw receiving lugs 25 are formed on the inside of wall 13 and allow a cover to be attached to the open end of the housing.

The adapter may have a filter within the housing. The attachment portion may be sized to correspond to the diameter of a first flush diverter suited to plumbing standards applicable in a particular country. Where plumbing standards dictate that a different diameter first flush water diverter be used, an attachment portion having an appropriate diameter and with an upstanding passage 15*a* may simply be fitted relative to the housing 11 in place of the one illustrated in FIG. 1. In this way a filter adapted to be received within the housing and the collector may be used with flow diverters of a variety of sizes by selecting an attachment portion of suitable size and mounting it relative to the collector. This minimises tooling.

Figure 3:
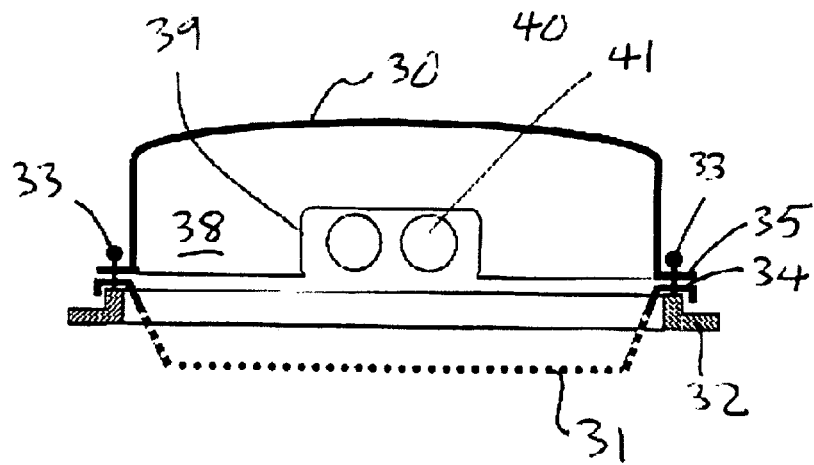
FIG. 3 is a vertical sectional view through a filter and cover adapted to close off the open end of the adapter; and, FIG. 4 is a plan view of a ring to which the cover shown in FIG. 3 may be secured.
Figure 4:
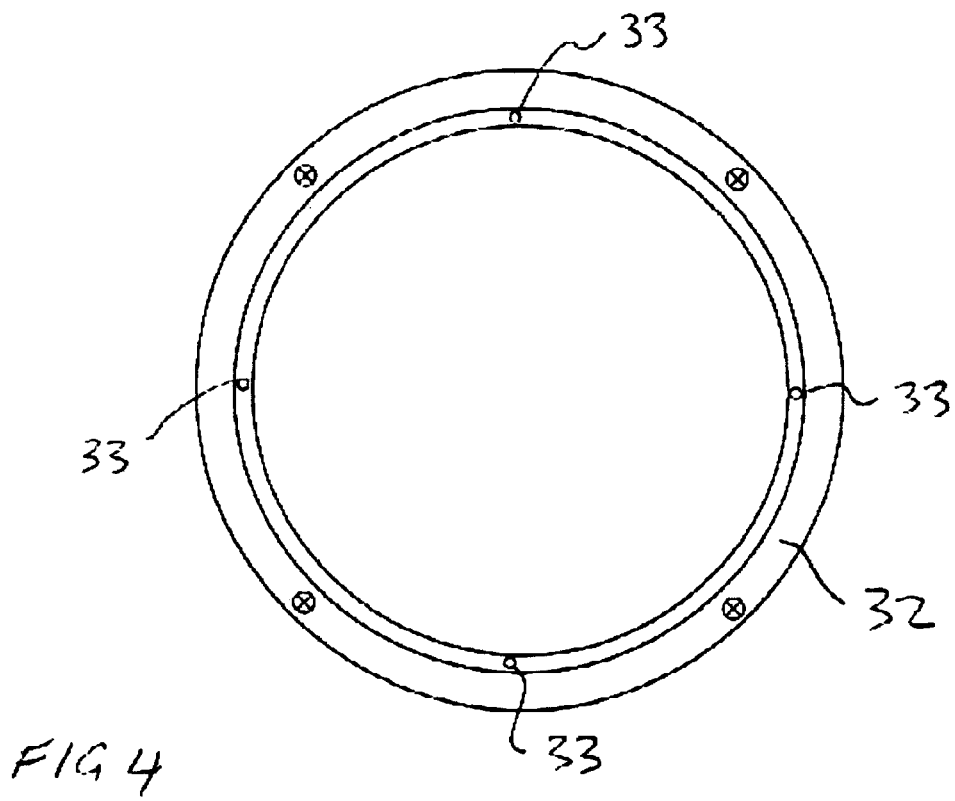

FIG. 3 shows a cover 30 and a filter 31. An adapter ring 32 extends around the cover 30. This ring 32 may for example be incorporated as part of the upper periphery of the housing. The ring 32 may be part of or secured to the periphery of an opening into a storage tank. In this way the ring allows a filter and cover to be fitted relative to the opening into a tank.

The ring 32 has fasteners 33 with enlarged heads which locate in apertures in a rim 34 of the filter 31 and in a flange 35 of the cover 30. These apertures may have a keyhole shape adapted to receive the enlarged heads of the fasteners and the filter 31 and the cover 30 may be rotated relative to the fasteners 33 to lock the filter and cover relative to the ring 32.

The cover 30 has a side wall 38 with a recessed portion 39 through which water inlets 40, 41 may introduce water into the adapter.

I claim:

1. An adapter for a first flush water diverter, the adapter having a collector for receiving water from a catchment area, the collector comprising a housing with a base wall, the base wall having a spigot extending therefrom and providing a passage from a lower part of the collector through which water may be directed into an attachment portion adapted to couple the adapter to a first flush water diverter and at least one outlet from the collector.

2. The adapter of claim 1 wherein the base wall is inclined and the base wall together with an upstanding cylindrical side wall provide a housing with the free end of the side wall forming an open top of the collector.

3. The adapter of claim 2 including two said outlets adjacent the passage.

4. The adapter of claim 2 including a filter extending across the open end of the collector.

5. The adapter of claim 4 including a cover attached to the side wall of the collector to extend over the filter and to close off the open end of the collector.

6. The adapter of claim 1 having strengthening ribs extending across an inside face of the base wall.

7. The adapter of claim 1 in combination with the attachment portion with the attachment portion having an upstanding passage received by the passage extending from the collector.

8. The adapter of claim 7 wherein the attachment portion has an inclined upper wall with the passage of the attachment portion extending from the upper wall thereof.

9. The adapter of claim 8 wherein the attachment portion includes a side wall extending downwardly of the upper wall thereof.

10. The adapter of claim 9 wherein the side wall of the attachment portion is cylindrical.

11. The adapter of claim 8 including a brace extending between the base wall of the collector and the upper wall of the attachment portion.

\* \* \* \* \*